US009448839B2

(12) United States Patent
Jain

(10) Patent No.: US 9,448,839 B2
(45) Date of Patent: Sep. 20, 2016

(54) BACKOFF JOB QUEUE POLLING MECHANISM

(71) Applicant: Oracle International Corporation, Redwood City, CA (US)

(72) Inventor: Nitin Jain, Mountain View, CA (US)

(73) Assignee: Oracle International Corporation, Redwood City, CA (US)

( * ) Notice: Subject to any disclaimer, the term of this patent is extended or adjusted under 35 U.S.C. 154(b) by 306 days.

(21) Appl. No.: 13/791,267

(22) Filed: Mar. 8, 2013

(65) Prior Publication Data

US 2014/0259018 A1 Sep. 11, 2014

(51) Int. Cl.
G06F 9/46 (2006.01)
G06F 9/48 (2006.01)

(52) U.S. Cl.
CPC .................... *G06F 9/4881* (2013.01)

(58) Field of Classification Search
None
See application file for complete search history.

(56) References Cited

U.S. PATENT DOCUMENTS

| 6,640,268 | B1 * | 10/2003 | Kumar ............................. 710/46 |
| 6,931,460 | B2 * | 8/2005 | Barrett ............................ 710/57 |
| 6,938,084 | B2 | 8/2005 | Gamache et al. |
| 7,027,462 | B2 | 4/2006 | Benveniste |
| 7,292,598 | B2 | 11/2007 | Ho et al. |
| 7,958,274 | B2 | 6/2011 | Archer et al. |
| 8,082,318 | B2 | 12/2011 | Hosking et al. |
| 8,108,623 | B2 | 1/2012 | Krishnaprasad et al. |
| 8,185,928 | B2 | 5/2012 | Smith |
| 8,724,612 | B2 * | 5/2014 | Al-Khudairi ................. 370/346 |
| 2003/0191795 | A1 | 10/2003 | Bernardin et al. |
| 2006/0023743 | A1 * | 2/2006 | Brown .................. H04L 69/168 370/466 |
| 2009/0077277 | A1 | 3/2009 | Vidal et al. |
| 2010/0162318 | A1 | 6/2010 | Smith |
| 2011/0142442 | A1 * | 6/2011 | Hirth .................. H04Q 11/0067 398/25 |
| 2012/0060164 | A1 | 3/2012 | Jiang et al. |

* cited by examiner

*Primary Examiner* — Tammy Lee
(74) *Attorney, Agent, or Firm* — Robert C. Kowert; Meyertons, Hood, Kivlin, Kowert & Goetzel, P.C.

(57) ABSTRACT

A backoff polling algorithm may use a minimum polling interval which represents an amount of time between repeated polls of a job step queue. When polled, the job step queue may indicate a number of job steps scheduled to execute currently. Additionally, the backoff polling algorithm may repeatedly poll the job step queue at the current polling interval and execute any job steps indicated until the step queue indicates that the number of job steps scheduled to execute currently is below a minimum threshold. While the indicated number of job steps is below the minimum threshold, the backoff polling algorithm may repeatedly increase the polling interval up to a predetermined maximum polling interval and poll at each increased interval until the indicated number of job steps is above the minimum threshold. The backoff polling algorithm may then decrease the polling interval to the minimum polling interval.

20 Claims, 7 Drawing Sheets

_US 9,448,839 B2_

BACKOFF JOB QUEUE POLLING MECHANISM

BACKGROUND

In software engineering, a 3-tier architecture may be considered a client-server architectural deployment style that utilizes the separation of functionality into layers (or tiers) in which each layer can be located on a physically separate computer. A standard 3-tier architecture may include presentation and application logic in a client tier, application and business logic in a middle tier application server, and data managed by database servers in a $3^{rd}$ tier. For instance, a user interface may execute on a desktop PC using a standard graphical user interface, while the functional process logic may include separate modules executing on a workstation or application server, and a database system may execute on a database server or mainframe that includes the computer data storage logic.

The middle tier code typically drives 3rd tier data queries, updates, and transactions and implements shared business logic. Data manipulation performed by the application is typically done on object representations of 3rd tier data obtained through data queries (or through other data manipulation APIs or SQL code in the database server).

By separating the application into different layers or tiers, a single layer may be modified or added without having to modifying the entire application. For example, the operating system of the presentation layer may be modified without the necessity of modifying the database layer.

In a typical 3-tier application, such as including a client, an app server and a database, the application logic typically resides on the app server while the application state is typically stored within the database. In order to monitor state changes, developers often have a thread running on the application server that periodically polls the database. The frequency of polling the database may affect the performance of the application. For example, if the database is polled too often, system resources, such as CPU cycles or heap space, may be wasted. On the other hand, if the database is not polled often enough, the system may become sluggish and not be responsive enough.

Prior solutions frequently involve using a single polling frequency based on the business and technical requirements. A major disadvantage of this approach is that the polling frequency does not adapt to varying load situations. A pre-determined polling frequency may work for average load situations, but not may work well in heavy load situations. Another typical approach is to use a notification based mechanism such as a message queue or advanced queue (AQ) where the business logic in the mid-tier may be notified when the application state changes, thereby eliminating the need to poll the database. However, a notification based approach may require significant architecture modifications to, and/or re-writing of, an existing application and can involve a large investment in terms of money and business risk.

SUMMARY

Described herein are various embodiments of systems and methods for a backoff polling algorithm that may determine a next polling interval (PI) to be used when polling a database for application state changes. For example, application server logic may utilize one embodiment of the backoff polling algorithm described herein to determine how often to poll a job step queue and the backoff polling algorithm may dynamically determine a changing polling interval to use.

Thus, a backoff polling algorithm may first set a polling interval to a minimum interval, where the polling interval may represent an amount of time between repeated polls of a job step queue. In response to being polled, the job step queue may be configured to indicate a number of job steps scheduled to execute currently. Additionally, the backoff polling algorithm may repeatedly poll the job step queue at the current polling interval and execute any job steps indicated by the step queue until the step queue indicates that the number of job steps scheduled to execute currently is below a minimum job step threshold.

While the number of job steps scheduled to execute currently is below the minimum job step threshold, the backoff polling algorithm may repeatedly increase the polling interval and poll the job step queue at each increased interval until the job step queue indicates that the number of job steps scheduled to execute currently is above the minimum job step threshold. In response to the job step queue indicating that the number of job steps scheduled to execute currently is above the minimum job step threshold, the backoff polling algorithm may decrease the polling interval to the minimum polling interval.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
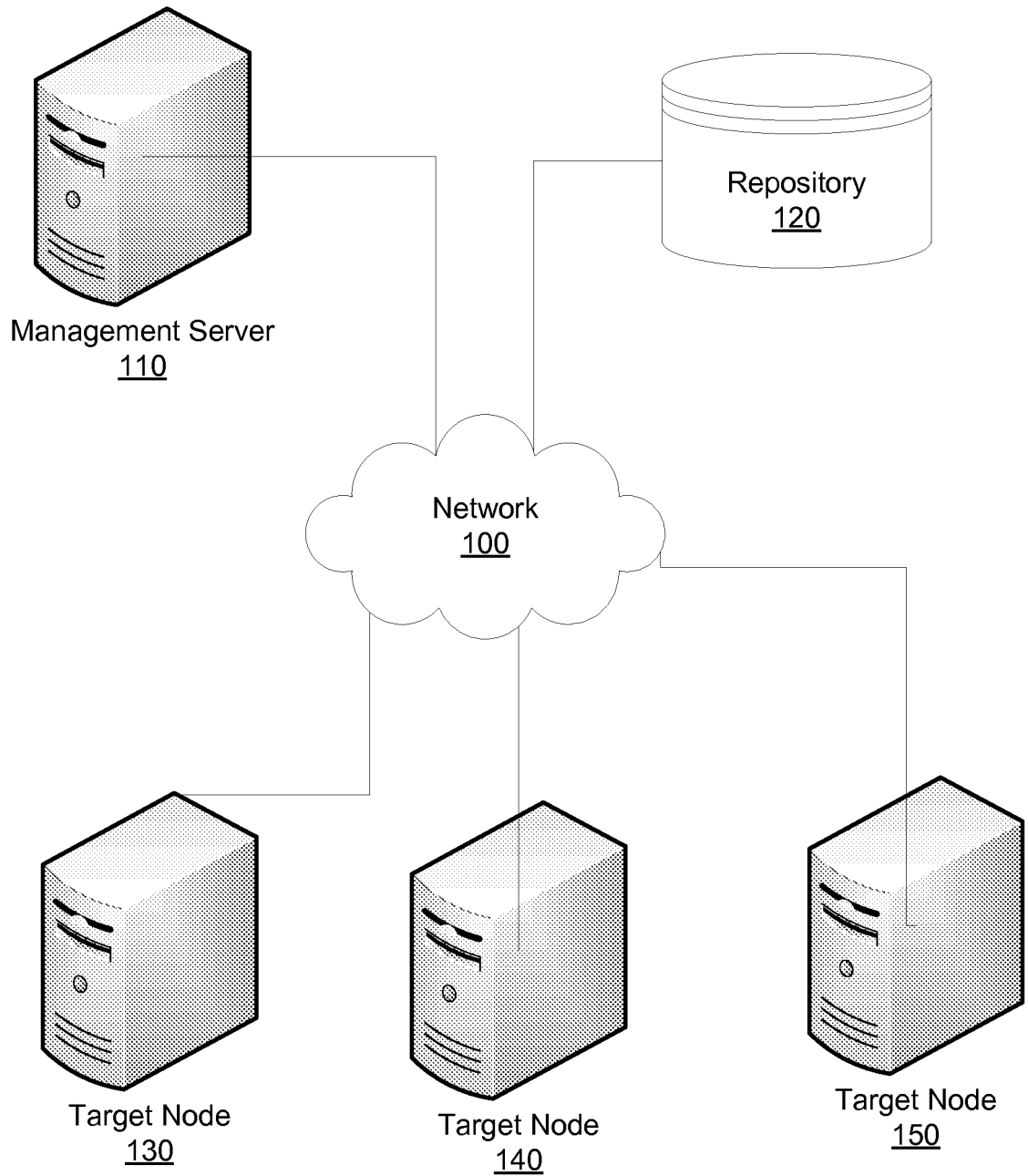
FIG. 1 is a block diagram illustrating one embodiment of a system capable of implementing a backoff polling algorithm, as described herein.

FIG. 1 is a block diagram illustrating one embodiment of a system capable of implementing a backoff polling algorithm, as described herein. For example, as illustrated in FIG. 1, a Management Server 110 may be configured to communicate over Network 100 with various target nodes (such as Target Nodes 130, 140 and 150) and with a database, such as Repository 120. According to various embodiments of the backoff polling algorithm described herein, Management Server 110 may utilize application (or job) state information on Repository 120 to launch and control multiple applications executing on the target nodes.

For instance, Management Server 110 may utilize a backoff polling algorithm to determine when and how often to poll Repository 120 for application state (or job step) information. As noted above, a backoff polling algorithm may determine a next polling interval (PI) to be used when polling a database for application state changes. A polling interval may represent an amount of time between repeated polls of a database or other repository of application state information, such as Repository 120. When polled for application state changes, Repository 120 may provide information indicating a number of application or job steps scheduled to execute currently. In other words, Management Server 110 may poll Repository 120 to determine which job steps need to be executed.

For example, a backoff polling algorithm executing on Management Server 110 may evaluate the pending system load to determine the immediate processing needs (e.g., the number of job steps that need to be executed currently). If the pending system load exceeds a pre-determined threshold, the backoff polling algorithm may set the polling interval to a minimum value. Thus, when the pending system load is high enough, the backoff polling algorithm may, according to one embodiment, determine that Management Server 110 should poll the Repository 120 more frequently, thereby possibly executing the scheduled job steps more efficiently and may reduce the latency between the time a job step is scheduled to be executed and the next time the repository is polled, according to some embodiments.

Thus, in response to the backoff polling algorithm determining a polling interval, Management Server 110 may repeatedly poll Repository 120 at the determined polling interval and may execute any application or job steps that are indicated as scheduled to execute currently until the number of job steps to execute current drops below a minimum threshold, according to one embodiment.

Similarly, if the evaluated pending system load is below a pre-determined threshold (using either the same or a different threshold value), the backoff polling algorithm may increment the current polling interval by a certain increment. The increment used to modify the current polling interval may be considered, and referred to herein, as a backoff value. When determining the backoff value and the new polling interval, the backoff polling algorithm may utilize a pre-determined maximum polling interval and ensure that the polling interval does not exceed the maximum polling interval, according to some embodiments.

For example, in one embodiment, Management Server 110 may be configured to repeatedly poll Repository 120, using the increasing polling interval, while the number of job steps to be currently executed is below a minimum threshold. In other words, as long as the number of job steps to be executing currently is below a certain threshold, Management Server 110 may poll Repository 110 less frequently, according to one embodiment. As long and the number of job steps to execute currently is low, the increased time between polls may not cause a significant effect on system performance, but may prevent system resource waste due to excessive polling, according to some embodiments. For instance, in some embodiments, Management Server 110 may use 1 as a minimum job step threshold for determining when to modify the polling interval. In other embodiments however, different threshold values may be used and threshold values may be configurable, such as by a business manager or system administrator.

Whenever the repository indicates that the number of job steps scheduled to execute currently is above a minimum threshold, the backoff polling algorithm may decrease the polling interval to the minimum polling interval, according to some embodiments.

In some embodiments, the backoff value may be a fixed value. In other words, the backoff polling algorithm may increase the polling interval linearly over time. When using a fixed backoff value, the backoff algorithm may be considered a linear backoff. In other embodiments, the backoff polling algorithm may increase the polling interval exponentially over time, thereby utilizing an exponential backoff. In yet other embodiments, a backoff polling algorithm may utilize both a linear backoff and an exponential backoff at different times or in different situations.

When determining whether to use a linear backoff or an exponential backoff, a backoff polling algorithm may analyze and evaluate how often a system load fluctuates, according to one embodiment. In general, various heuristics may be utilized by a backoff polling algorithm to determine whether or use a linear or an exponential backoff, according to different embodiments. For example, if a system exhibits frequent load spikes that are separated by long periods of inactivity, a backoff polling algorithm may utilize an exponential backoff that causes more rapid changes in the polling interval. If a system does not exhibit frequent load spikes, a backoff polling algorithm may utilize a linear backoff. In some embodiments, the backoff polling algorithm may determine whether to use a linear or exponential backoff based on the system's load history and may change from one backoff type to another (e.g., from linear to exponential) if the system's load history changes over time.

Thus, a backoff polling algorithm may use the pending system load information to make predictions about the upcoming activity in the near future and adjust the polling interval based on that prediction, according to some embodiments. Additionally, a backoff polling algorithm may adjust the rate at which the polling interval increase or decreases based on current system activity, which may result in effective handling of load spikes and long period of inactivity, and therefore may result in efficient use of system resources.

A backoff polling algorithm, according to some embodiments, may provide administrators or business managers an option between using a linear or an exponential backoff interval adjustment, as well as the ability to fine-tune the chosen backoff interval adjustment, such as to adapt to current business requirements.

Figure 2:
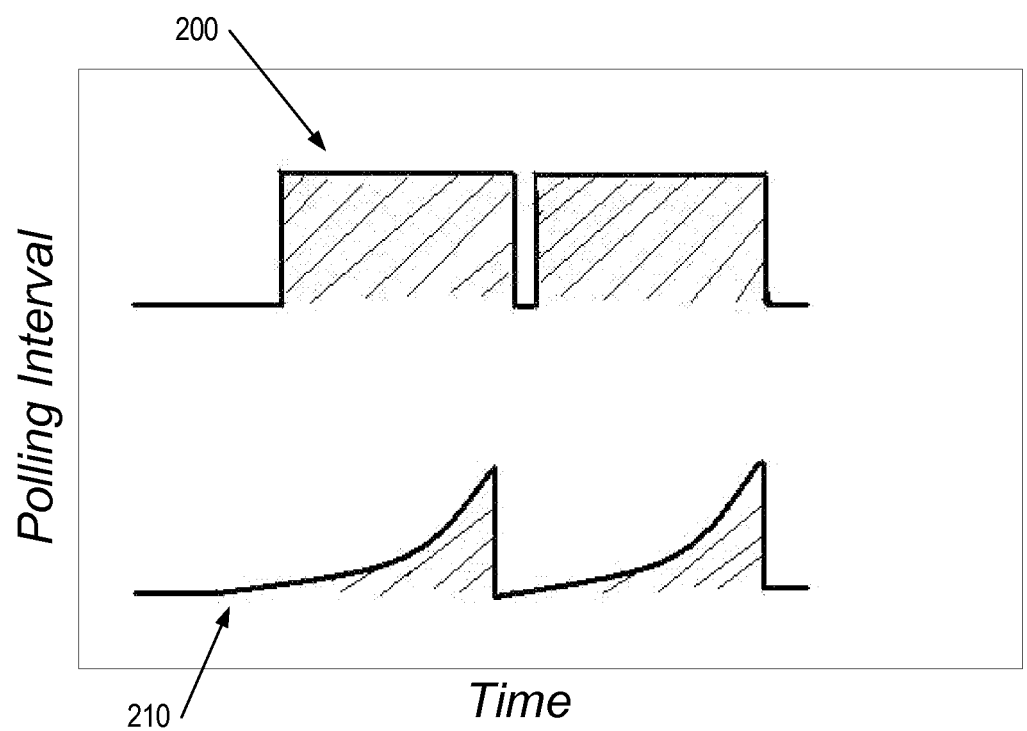
FIG. 2 is a graph illustrating a comparison between a fixed polling frequency and a linear backoff based polling frequency, as described herein.

FIG. 2 is a graph illustrating a comparison between a fixed polling frequency and a linear backoff based polling frequency, as described herein. The graphs shown in FIG. 2 illustrate polling interval on the y-axis and time on the x-axis. Graph 200 represents a fixed polling frequency, while graph 210 illustrates a linear backoff polling frequency as may be implemented by one embodiment of a backoff polling algorithm, as described herein. Within each of the graphs of FIG. 2, the shaded area under the graph represents a measure of latency of the polling frequency.

As is apparent by a comparison of the two graphs in FIG. 2, a system utilizing a backoff polling algorithm, as described herein, may experience significantly reduced latency as compared to a system utilized a fixed polling frequency. Please note however, that the fixed polling frequency illustrated in graph 200 is not same as a fixed linear backoff value described herein. A fixed polling frequency represents a system that polls a database at a constant, fixed rate, whereas a backoff polling algorithm described herein may modify the polling interval (and therefore the frequency) by a fixed amount (e.g., a linear backoff value), according to one embodiment.

Figure 3:
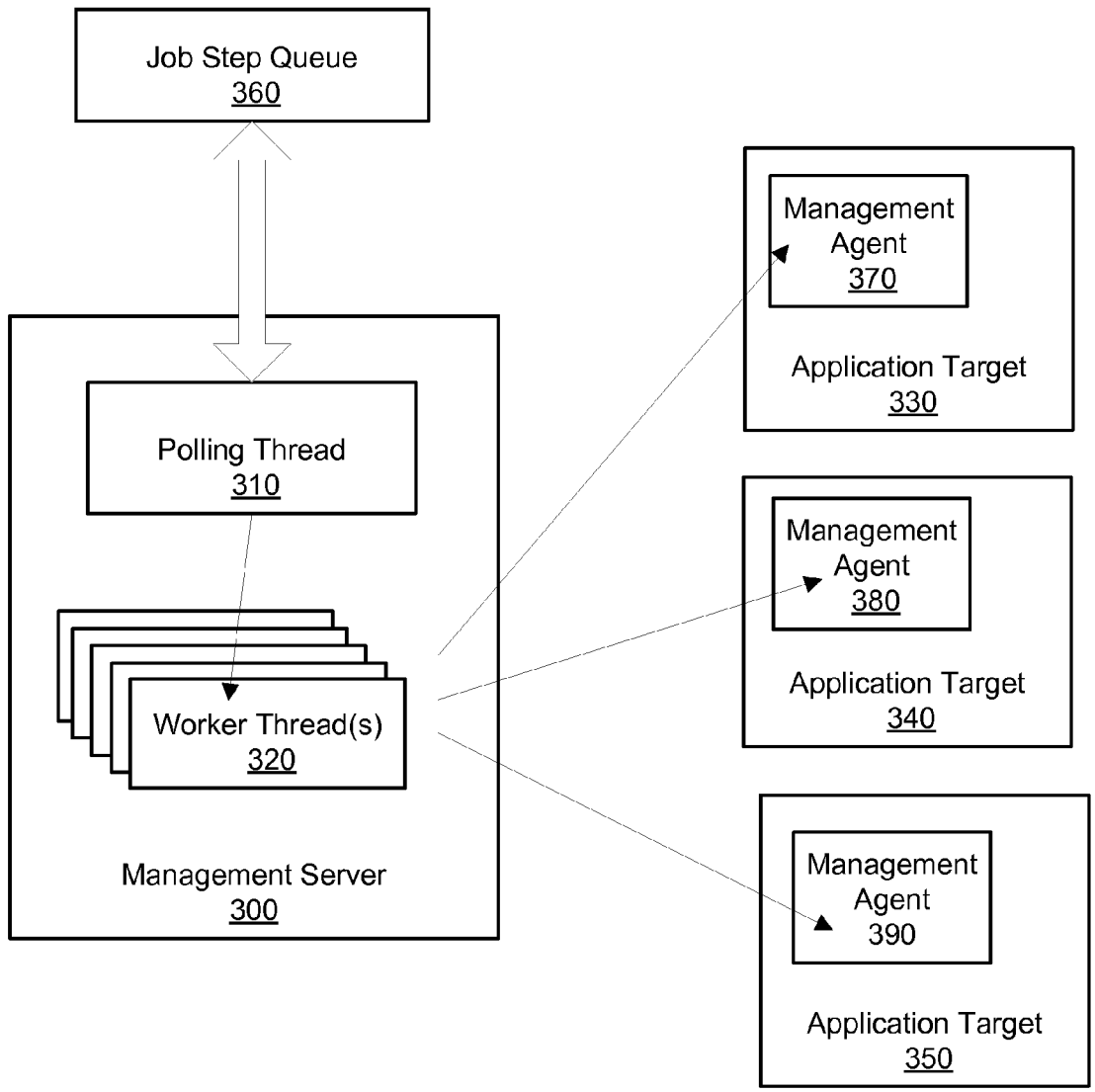
FIG. 3 is a block diagram representing, according to one embodiment, a system using a backoff polling algorithm, as described herein.

FIG. 3 is a block diagram representing, according to one embodiment, a system using a backoff polling algorithm, as described herein. As illustrated in FIG. 3, a Management Server 300 may communicate with one or more application targets (such as Application Targets 330, 340 and 350) to execute application job steps. Management Server 300 may communicate with management agents (such as Management Agents 370, 380 and 390) on each application target.

Executing within Management Server 300 may be a Polling Thread 310 and one or more Worker Threads 320, according to one embodiment. Thus, each worker thread on the management server may control an application on an application target through the management agent on that application target. Additionally, in some embodiments, Polling Thread 310 may poll Job Step Queue 360 to determine which job steps are ready to be executing currently. As noted above, Polling Thread 310 may utilize a backoff polling algorithm to determine when and how often to poll Job Step Queue 360, according to some embodiments.

In one embodiment, management server 300 may represent an instance of a job system dispatcher module of the Oracle's Enterprise Manager Cloud Control™ framework.

According to one embodiment, when implementing a backoff polling algorithm described herein, Polling Thread 310 may initially use a minimum polling interval. Polling Thread 310 may repeatedly poll Job Step Queue 360 at the minimum polling interval to determine how many and/or which job steps are scheduled to execute currently. While the number job steps scheduled to execute currently is below the minimum job step threshold, Polling Thread 310 may be configured to repeatedly increase the polling interval thereby decreasing the polling frequency, and poll Job Step Queue 360 at each increased polling interval until the number of job steps scheduled to execute currently is above the minimum job step threshold.

In some embodiments Polling Thread 310 may be configured to use a value of 1 as the minimum job step threshold. Thus, as long as there are no job steps scheduled to execute currently, Polling Thread 310 may continue increasing the polling interval (e.g., decrease the polling frequency) up to a predetermined maximum polling interval. When a job step is scheduled to execute currently, Polling Thread 310 may then decrease the polling interval to the minimum value, thereby increasing the polling frequency, according to some embodiments.

In some embodiment, Polling Thread 310 may decrease the polling interval to the minimum value by setting the polling interval directly to the minimum value, while in other embodiments Polling Thread 310 may decrease the polling interval in multiple intervals and across multiple polling cycles (e.g., decreasing the polling interval between each polling of the job step queue until the polling interval reaches the minimum value). Please note that in some embodiments, Polling Thread 310 may only continue to decrease the polling interval to the minimum value while the number of job steps scheduled to execute currently remains above the minimum job step threshold. If, while decreasing the polling interval to the minimum value across multiple polling cycles, the number of job steps scheduled for execution currently has dropped below the minimum job step threshold, Polling Thread 310 may again begin increasing the polling interval even if the polling interval had not actually reached the minimum polling interval, according to one embodiment. In some embodiments, the rate at which Polling Thread 310 decreases the polling interval may be greater than the rate at which Polling Thread 310 increases the polling interval. For example, when the number of job steps scheduled to execute currently exceeds the minimum job step threshold, Polling Thread 310 may decrease the polling interval toward the minimum polling interval at a faster rate than Polling Thread 310 increases the polling interval when the number of job steps scheduled to execute currently is below the minimum job step threshold.

In addition, Polling Thread 310 may, in some embodiments, may keep track of the number of times the job step queue has been polled at the minimum polling interval and if the job step queue has been polled at the minimum polling interval more often than a predetermined maximum threshold, Polling Thread 310 may increase the polling interval (either linearly or exponentially) for at least one polling cycle. Thus, if Job Step Queue 360 has been repeatedly polled at a high frequency (e.g., using the minimum polling interval) due to a high amount of pending work (e.g., the number of job steps scheduled to execute currently is above the minimum threshold), Polling Thread 310 may increase the polling interval, such as to prevent excessing polling load.

According to some embodiments, the increment value (e.g., the backoff value) used to adjust the polling interval may be adjustable according to user input. For example, an administrator may be able to set the fixed backoff value used as a linear backoff value and/or may be able to set the size of the exponentially increasing incremental value used by Polling Thread 310 to determine the next polling interval.

Figure 4:
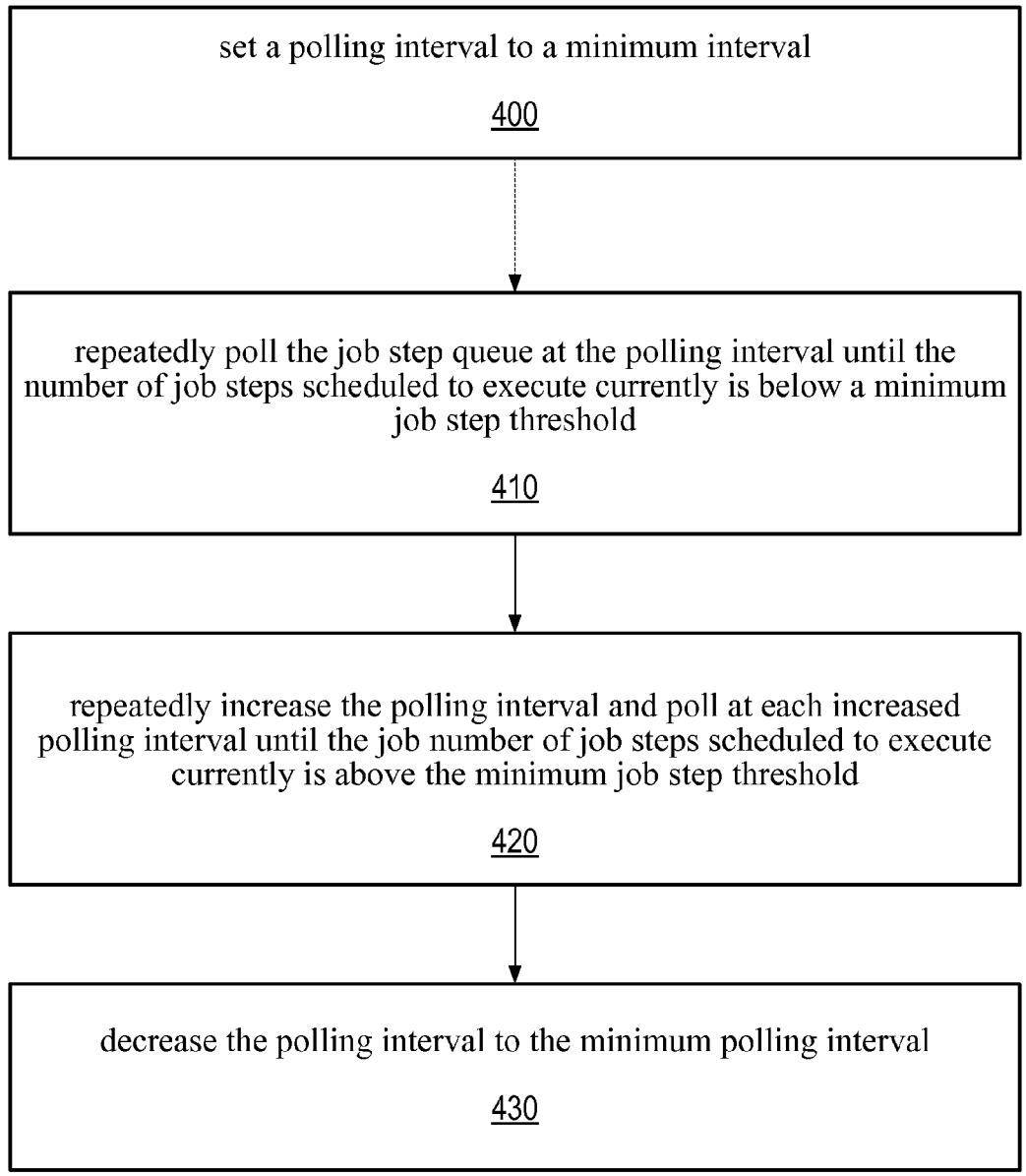
FIG. 4 is a flowchart illustrating one embodiment of a method for implementing a backoff polling algorithm, as described herein.

FIG. 4 is a flowchart illustrating one embodiment of a method for implementing a backoff polling algorithm, as described herein. The method illustrated in FIG. 4 is described herein using the Polling Thread 310 of Management Server 300 and Job Step Queue 360 illustrated in FIG. 3 by way of example. Please note that in other embodiments, the method illustrated in FIG. 4 may be implemented by other modules executing on the same or different machines.

As shown in block 400, Polling Thread 310 may be configured to set a polling interval to a minimum interval, according to some embodiments. For example, in some embodiments, a default, minimum polling interval may be used as an initial polling interval. Polling Thread 310 may then repeatedly poll a job step queue, such as Job Step Queue 360, at that polling interval until the number of job steps scheduled to execute currently is below a minimum job step threshold, as illustrated in block 410. For example, in one embodiment, Polling Thread 310 may be configured to use a minimum job step threshold of 1 and therefore may repeatedly poll Job Step Queue 360 at the minimum polling interval until no job step is scheduled to execute currently.

Furthermore, once the number of job steps scheduled to execute currently is below the minimum job step threshold, Polling Thread 310 may be configured to repeatedly increase the polling interval and poll Job Step Queue 360 at each increased polling interval until the number of job steps scheduled to execute currently is above the minimum job step threshold (or until the polling interval reaches a predetermined maximum polling interval), as shown in block 420. For example, if the minimum job step threshold of 1 is used, Polling Thread 310 may be configured to repeatedly increase the polling interval (thereby decreasing the polling frequency) and poll at each increased polling interval until at least 1 job step is scheduled to execute currently, according to one embodiment. Please note that in some embodiments, the job step queue may initially not have any pending job steps scheduled to execute and therefore Polling Thread 310 may begin increasing the polling interval immediately.

Once the number of job steps scheduled to execute currently is above the minimum job step threshold, Polling Thread 310 may be configured to decrease the polling interval to the minimum polling interval, as shown in FIG. 4, according to one embodiment. As noted above, Polling Thread 310 may decrease the polling interval to the minimum polling interval in different manners according to different embodiments. For instance, in one embodiment, Polling Thread 310 may set the polling interval directly to the minimum polling interval value, while in another embodiment Polling Thread 310 may repeatedly decrease the polling interval over multiple polling cycles.

In other words, Polling Thread 310 may be configured to adjust the polling interval (and thereby the polling frequency) based (at least) on the current job step load, according to some embodiments. For example, using a minimum job step threshold of 1, Polling Thread 310 may use the minimum polling interval (e.g., the highest polling frequency), until there are no job steps scheduled to execute currently (e.g., until the job step load is low) and then repeatedly increase the polling interval (e.g., decrease the polling frequency) until at least one job step is scheduled to execute currently (e.g., until the job step load increases), according to one embodiment.

Figure 5:
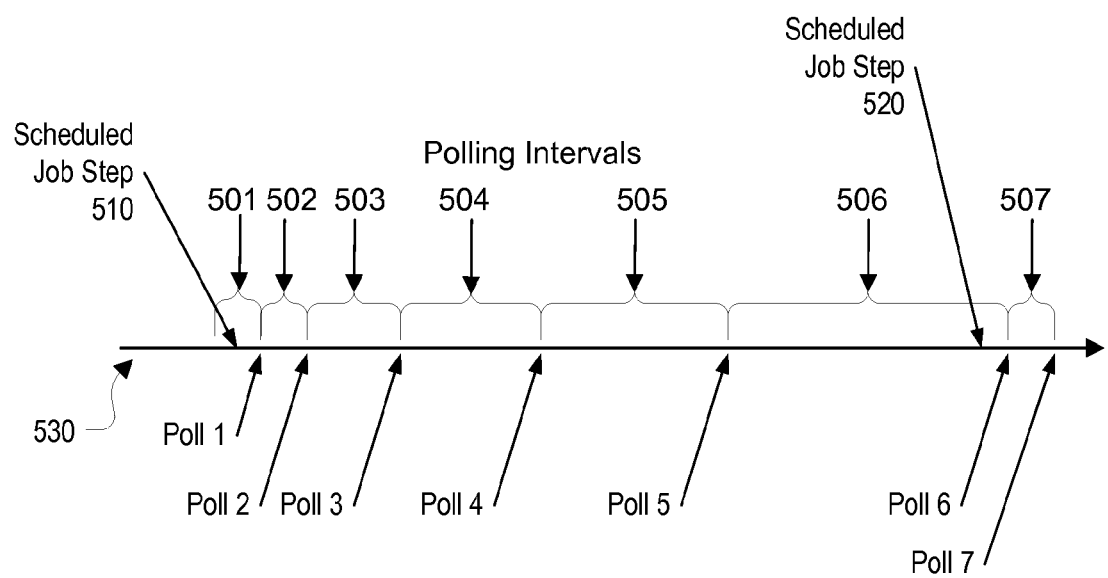
FIG. 5 is a logical timeline illustrating of the relationship between polling intervals and scheduled job steps when utilizing a backoff polling algorithm as described herein, according to one embodiment.

FIG. 5 is a logical timeline illustrating of the relationship between polling intervals and scheduled job steps when utilizing a backoff polling algorithm as described herein, according to one embodiment. As shown in FIG. 5, arrow 530 represents time increasing to the right, with two job steps scheduled to execute at points 510 and 520 respectively. Also illustrated in FIG. 5 are the points at which the job queue is polled, indicated by arrows Poll 1 through Poll 7. Similarly the relative sizes of the poll interval used between polls is indicated by Polling Intervals 501 through 507.

As described above, a backoff polling algorithm may initially use a minimum polling interval. Thus, Polling Thread 310 may wait for polling interval 501 before polling at point Poll 1 on timeline 530. As indicated by Scheduled Job Step 510, when Polling Thread 310 polls at point Poll 1, one job step will be scheduled to execute. Using an example minimum job step threshold of 1, Polling Thread 310 may repeatedly poll the job step queue using the minimum polling interval until no job steps are scheduled to execute currently.

Thus, after waiting through polling interval 502, Polling Thread 310 may poll the job step queue at point Poll 2. Since no job steps are indicated as scheduled to execute currently after Poll 2, Polling Thread 310 may, according to one embodiment, begin repeatedly increasing the poll interval, polling at each new interval until at least one job step is scheduled to execute currently. As illustrated in FIG. 5, Polling Thread 310 may increase the polling interval, as indicated by the increased size of polling intervals 503, 504, 505 and 506, polling at each new interval, indicated by points Poll 3, Poll 4, Poll 5 and Poll 6.

According to the example embodiment illustrated by FIG. 5, Poll 6 may indicate that a job step is scheduled to execute currently, as indicated by Scheduled Job Step 520. Thus, Polling Thread 310 may decrease the polling interval to the minimum polling interval, as indicate by Polling Interval 507. While the example embodiment illustrated in FIG. 5 shows an immediate decrease to the minimum polling interval, in some embodiments, Polling Thread 310 may be configured to decrease the polling interval to the minimum over two or more polling cycles.

Figure 6:
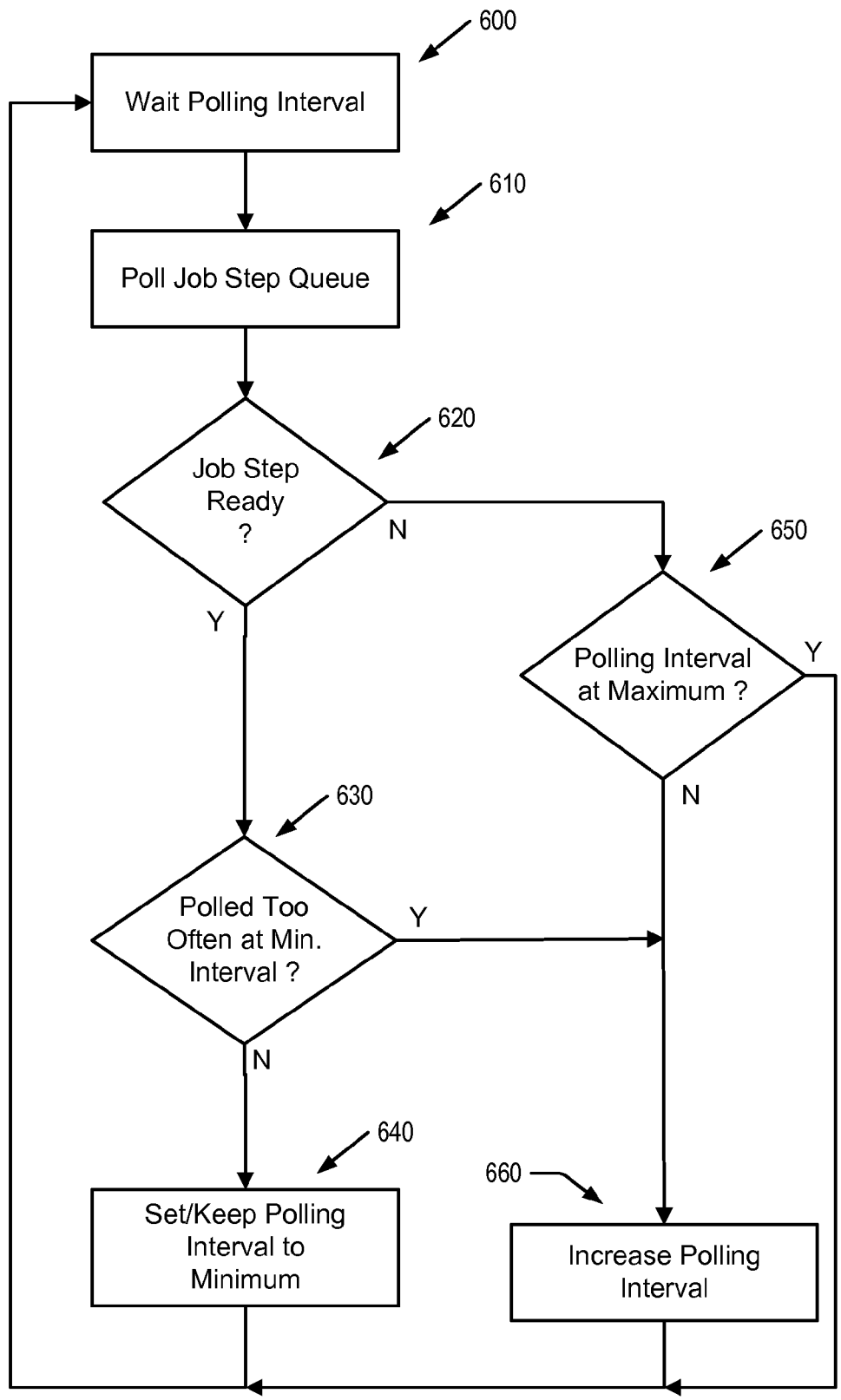
FIG. 6 is a flowchart illustrating one embodiment of method for implementing a backoff polling algorithm utilizing thresholds.

FIG. 6 is a flowchart illustrating one embodiment of method for implementing a backoff polling algorithm utilizing thresholds. As illustrated by block 600, Polling Thread 310 may wait for an amount of time indicated by the current polling interval and then may poll the job step queue, as shown in block 610.

If there is no job step scheduled to currently execute, as indicated by the negative output of decision block 620, Polling Thread 310 may then determine whether or not the polling interval is currently at the maximum polling interval, as indicated by decision block 650. Please note that the example embodiment illustrated in FIG. 6 utilizes a minimum job step threshold of 1 in decision block 620 and that other embodiments may use other values as a minimum job step threshold value.

If the polling interval is not currently at the maximum, as indicated by the negative output of decision block 650, Polling Thread 310 may then increase the polling interval, as shown in block 660.

If there is at least one job step scheduled to execute currently, as indicated by the positive output of decision block 620, Polling Thread 310 may then determine whether or not the job step queue has been polling too many times at the minimum polling interval, as shown in decision block 630. If, as indicated by the negative output of decision block 630, the job step queue has not been polled more than the maximum threshold at the minimum polling interval, Polling Thread 310 may set or keep the polling interval to the minimum value, as shown in block 640. If, however, the job step queue has been polled more than the maximum threshold, as indicated by the positive output of decision block 630, Polling Thread 310 may then increase the polling interval for at least one polling cycle, as shown in block 660.

Please note that the embodiment illustrated in FIG. 6 represents only some of the features and/or actions that may be performed by a backoff polling algorithm and that other embodiments may include different or additional actions compared to those shown in FIG. 6.

Figure 7:
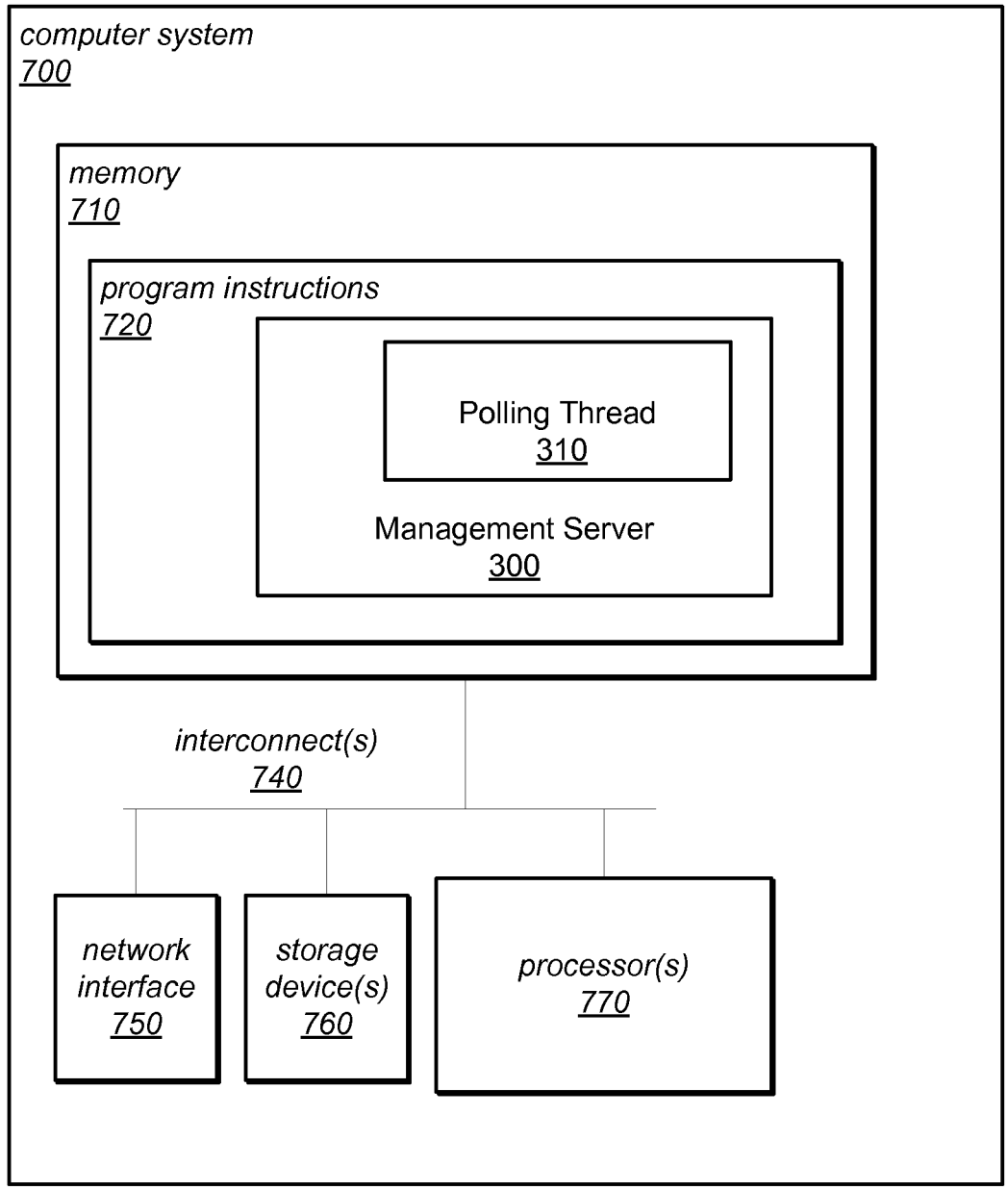
FIG. 7 is a logical block diagram illustrating an example system configured to implement a backoff polling algorithm, according to one embodiment.

The techniques described herein for a backoff polling algorithm may be implemented in any of a wide variety of computing systems. FIG. 7 illustrates an example computing system that is configured to implement a backoff polling algorithm, as described herein and according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 700 may include a processor unit 770 (possibly including multiple processors, a single-threaded processor, a multi-threaded processor, a multi-core processor, etc.) which may be configured to execute one or more modules or applications configured to implement a backoff polling algorithm, such as Management Server 300 or Polling Thread 310, which may be present within program instructions 720 stored in memory 710 of the same computer system 700 or may be present within program instructions stored within a memory of another computer system similar to or different from computer system 700.

The computer system 700 may include one or more system memories 710 (e.g., one or more of cache, SRAM DRAM, RDRAM, EDO RAM, DDR RAM, SDRAM, Rambus RAM, EEPROM, etc.), a system interconnect 740 (e.g., LDT, PCI, ISA, etc.), a network interface 750 (e.g., an ATM interface, an Ethernet interface, a Frame Relay interface, etc.), and one or more storage device(s) 745 (e.g., optical storage, magnetic storage, etc.). The memory medium may include other types of memory as well, or combinations thereof. In other embodiments, computer system 700 may include more, fewer, or different components than those illustrated in FIG. 7 (e.g., video cards, audio cards, additional network interfaces, peripheral devices, etc.). The processor(s) 770, the storage device(s) 745, the network interface 750 and the system memory 710 may be coupled to the system interconnect 740.

One or more of the system memories 710 may include program instructions 920 configured to implement some or all of the techniques described herein for a backoff polling algorithm (according to any of the embodiments described herein). For example, one or more of the system memories 710 may include code to implement and/or execute Polling Thread 310 or Management Server 300, according to one embodiment.

In various embodiments, program instructions 720, Polling Thread 310, Management Server 300, and/or individual sub-modules of these components may each be implemented in any of various programming languages or methods. For example, in one embodiment, Polling Thread 310 may be JAVA based, while in another embodiment, it may be written using the C or C++ programming languages. Similarly, Management Server 300 may be written using Java, C, C++, or another programming language, according to various embodiments. Moreover, in some embodiments, Management Server 300, Polling Thread 310 and/or various sub-modules thereof may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
  performing, by a computer:
    setting a polling interval to a minimum polling interval, wherein the polling interval represents an amount of time between repeated polls of a job step queue; wherein in response to being polled the job step queue is configured to indicate one or more job steps scheduled to execute currently;

repeatedly polling the job step queue at the polling interval and executing any job steps indicated by the job step queue as scheduled to execute currently until a number of job steps scheduled to execute currently is below a minimum job step threshold, wherein said repeatedly polling the job step queue at the polling interval comprises determining that the job step queue has been polled at the minimum polling interval more often than a predetermined maximum threshold and increasing the polling interval for at least one polling cycle;

while the number of job steps scheduled to execute currently is below the minimum job step threshold:
repeatedly increasing the polling interval; and
polling the job step queue at each increased polling interval and executing any job steps indicated by the job step queue as scheduled to execute currently until the number of job steps scheduled to execute currently is above the minimum job step threshold; and in response to the number of job steps scheduled to execute currently being above the minimum job step threshold, decreasing the polling interval to the minimum polling interval.

2. The method of claim 1, wherein said repeatedly increasing the polling interval comprises repeatedly increasing the polling interval by a variable interval increment, wherein the variable increment varies exponentially between each increase.

3. The method of claim 1, wherein said repeatedly increasing the polling interval comprises repeatedly increasing the polling interval by a fixed interval increment up to a predetermined maximum polling interval.

4. The method of claim 3, wherein the interval increment is adjustable based on user input.

5. The method of claim 1, wherein the minimum job step threshold is adjustable based on user input.

6. The method of claim 1, wherein decreasing the polling interval to the minimum polling interval comprises repeatedly decreasing the polling interval over a plurality of polling intervals during which the number of job steps scheduled to execute currently remains above the minimum job step threshold.

7. The method of claim 1, wherein the polling interval is decreased from an interval reached after multiple increases from said repeatedly increasing.

8. A non-transitory, computer-readable storage medium storing program instructions that when executed on one or more computers cause the one or more computers to perform:

setting a polling interval to a minimum polling interval, wherein the polling interval represents an amount of time between repeated polls of a job step queue; wherein in response to being polled the job step queue is configured to indicate one or more job steps scheduled to execute currently;

repeatedly polling the job step queue at the polling interval and executing any job steps indicated by the job step queue as scheduled to execute currently until a number of job steps scheduled to execute currently is below a minimum job step threshold, wherein said repeatedly polling the job step queue at the polling interval comprises determining that the job step queue has been polled at the minimum polling interval more often than a predetermined maximum threshold, and increasing the polling interval for at least one polling cycle;

repeatedly increasing the polling interval and polling the job step queue at each increased polling interval and executing any job steps indicated by the job step queue as scheduled to execute currently until the number of job steps scheduled to execute currently is above the minimum job step threshold; and decreasing the polling interval to the minimum polling interval.

9. The storage medium of claim 8, wherein said repeatedly increasing the polling interval comprises repeatedly increasing the polling interval by a variable interval increment, wherein the variable increment varies exponentially between each increase.

10. The storage medium of claim 8, wherein said repeatedly increasing the polling interval comprises repeatedly increasing the polling interval by a fixed interval increment up to a predetermined maximum polling interval.

11. The storage medium of claim 10, wherein the fixed interval increment is adjustable based on user input.

12. The storage medium of claim 8, wherein the minimum job step threshold is adjustable based on user input.

13. The storage medium of claim 8, wherein decreasing the polling interval to the minimum polling interval comprises repeatedly decreasing the polling interval over a plurality of polling intervals during which the number of job steps scheduled to execute currently remains above the minimum job step threshold.

14. The system of claim 8, wherein the polling interval is decreased from an interval reached after multiple increases from said repeatedly increasing.

15. A system, comprising:
one or more processors;
memory coupled to the one or more processors, wherein the memory stores program instructions that when executable on the one or more processors cause the one or more processors to perform:

setting a polling interval to an initial interval, wherein the polling interval represents an amount of time between repeated polls of a job step queue; wherein in response to being polled the job step queue is configured to indicate one or more job steps scheduled to execute currently;

repeatedly increasing the polling interval and polling the job step queue at each increased polling interval and executing any job steps indicated by the job step queue as scheduled to execute currently until a number of job steps scheduled to execute currently is above a minimum job step threshold;

in response to the number of job steps scheduled to execute currently being above the minimum job step threshold, decreasing the polling interval to a minimum polling interval; and repeatedly polling the job step queue at the polling interval and executing any job steps indicated by the job step queue as scheduled to execute currently, wherein said polling the job step queue at the polling interval comprises determining that the job step queue has been polled at the minimum polling interval more often than a predetermined maximum threshold and increasing the polling interval for at least one polling cycle.

16. The system of claim 15, wherein said repeatedly increasing the polling interval comprises repeatedly increasing the polling interval by a variable interval increment, wherein the variable increment varies exponentially between each increase up to a predetermined maximum polling interval.

17. The system of claim 15, wherein said repeatedly increasing the polling interval comprises repeatedly increasing the polling interval by a fixed interval increment up to a predetermined maximum polling interval.

18. The system of claim 17, wherein the fixed interval increment is adjustable based on user input.

19. The system of claim 15, wherein the minimum job step threshold is adjustable based on user input.

20. The system of claim 15, wherein decreasing the polling interval to the minimum polling interval comprises repeatedly decreasing the polling interval over a plurality of polling intervals during which the number of job steps scheduled to execute currently remains above the minimum job step threshold.

* * * * *